Figure 1:
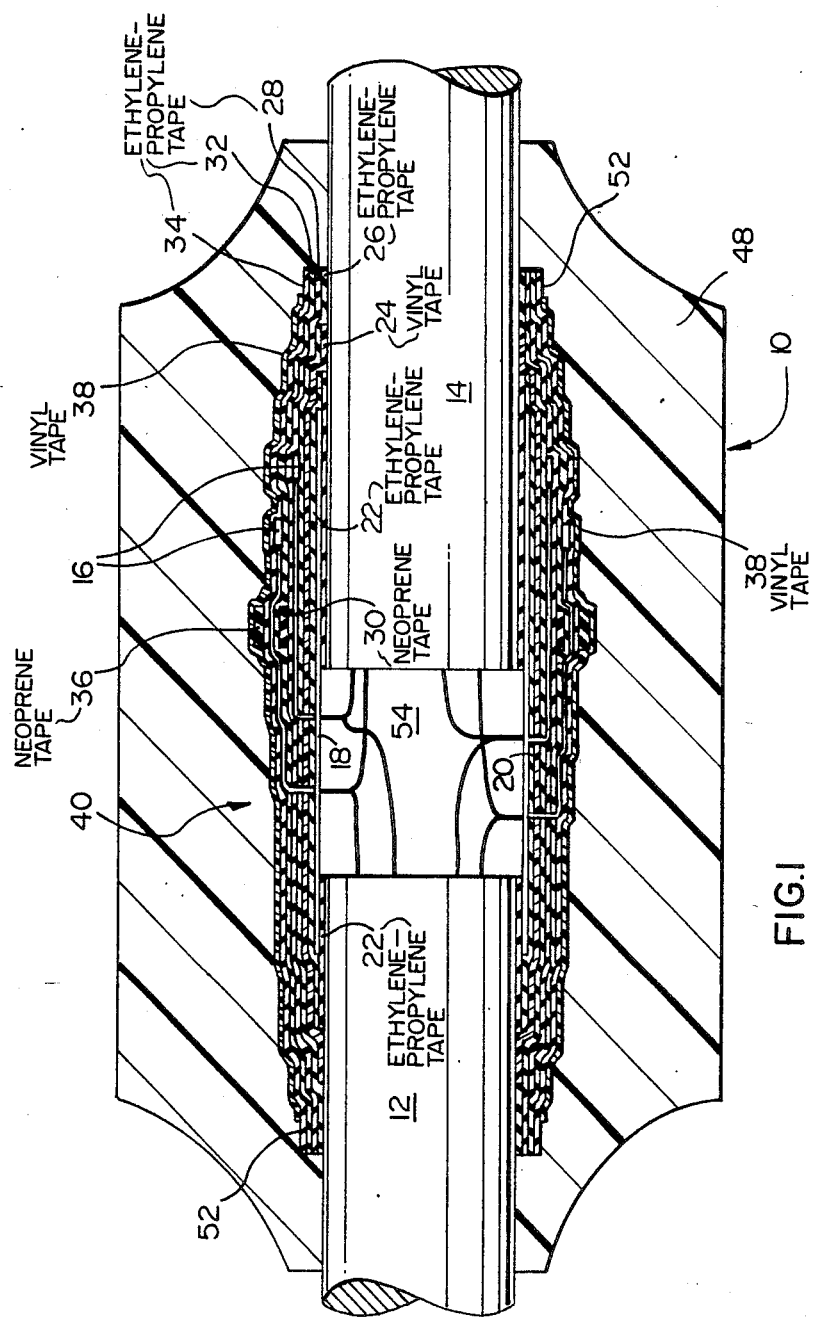

United States Patent [19]

Charlebois

[11] Patent Number: 4,678,866

[45] Date of Patent: Jul. 7, 1987

[54] FORMING OF CABLE SPLICE CLOSURES

[75] Inventor: Leonard J. Charlebois, Kanata, Canada

[73] Assignee: Northern Telecom Limited, Montreal, Canada

[21] Appl. No.: 752,747

[22] Filed: Jul. 8, 1985

[51] Int. Cl.⁴ ............................................ H02G 15/08
[52] U.S. Cl. .................................... 174/88 R; 156/49; 174/72 R; 174/84 R
[58] Field of Search .................... 174/84 R, 88 R, 78, 174/72 R; 156/49

[56] References Cited

U.S. PATENT DOCUMENTS

| | | | |
|---|---|---|---|
| 3,753,204 | 8/1973 | Thompson et al. | 174/78 |
| 4,092,488 | 5/1978 | Hayami et al. | 174/84 R |
| 4,164,621 | 8/1979 | Silva | 174/78 |
| 4,322,573 | 3/1982 | Charlebois | 174/72 R |
| 4,490,315 | 12/1984 | Charlebois et al. | 264/40.2 X |
| 4,496,795 | 1/1985 | Honnik | 156/49 X |
| 4,528,419 | 7/1985 | Charlebois et al. | 156/49 X |
| 4,549,039 | 10/1985 | Charlebois et al. | 174/88 R X |
| 4,570,032 | 2/1986 | Charlebois et al. | 156/49 X |
| 4,581,480 | 4/1986 | Charlebois | 174/84 R |

Primary Examiner—Morris H. Nimmo
Attorney, Agent, or Firm—R. J. Austin

[57] ABSTRACT

Forming an encapsulated splice region between cables in which conductors of one cable are electrically connected to conductors of the other cable to form splices. After electrically isolating splices from one another, a barrier layer is provided which extends axially across and beyond the splices onto the cables and then a plastic encapsulation is molded so as to enclose the barrier layer. The materials of the molding and barrier layer are such that they do not unite at any interfacial region between them. This construction makes it easier to open the splice region subsequently.

7 Claims, 3 Drawing Figures

FORMING OF CABLE SPLICE CLOSURES

This invention relates to the forming of cable splice closures.

A telecommunications cable extending from a central office and for underground or aerial use comprises a core having a plurality of pairs of individually insulated conductors. There may up to 3600 pairs of conductors in the core. When laying cable, it is sometimes necessary to join cables together, end-to-end, to achieve a required length of laid cable. Conventionally, in such situations, conductors are spliced together from cable-to-cable by removing the end portions of core surrounding material, i.e. cable sheaths and jackets so that the cores project beyond them, bringing the cable cores close together and then joining the conductor ends to form splices while retaining them between the cable sheaths and jackets. Splices are then sealed and a closure is placed over the region of the splices, i.e. to bridge the gap between and extend over the sheaths. The type of closure which has been used successfully in commercial practice is one in which it is formed as an encapsulation by molding techniques. Such a construction is described in U.S. Pat. Nos. 4,152,539 granted May 1, 1979 and 4,322,573 granted Mar. 13, 1982, both patents being in the name of L. J. Charlebois.

While the construction using a molded encapsulation is commercially successful and is cheaper than more established closure practices including the use of heat shrinkable materials, nevertheless problems have been found when it is required to open an encapsulated splice region. The methods discussed in the abovementioned U.S. patents, involve the location of heat softenable material around the splices for the purpose of forming seals. The heat softenable material is raised above its heat softening temperature by the heat produced during the molding operation and fuses into a single mass to form a seal around each splice. Also the material of the encapsulation successfully bonds to the softened sealing material to produce a further seal. The problem, however, it that when it is required to open the encapsulated splice region to reach individual splices, then the removal of the encapsulation and the heat softenable sealing material is a lengthy and difficult process.

The present invention concerns a process of forming an encapsulated splice region between two cable ends and an assembly of two cables including such a region in which the above problem is reduced. The present invention also extends to a process and an assembly of two cables having an encapsulated splice region in which the cables are gas pressurizable.

Accordingly, the present invention provides a method of forming an encapsulated splice region joining two cables comprising locating two cable end portions close together and substantially in axial alignment; electrically connecting conductors of one cable with those of the other to form splices and enshrouding each individual splice with dielectric material to electrically isolate it from other splices in the region; covering the splices by surrounding the cable end portion at each side of the splices with a barrier layer which extends also over the splices and between the cable end portions to enclose a region between the cable end portions; and forming a plastic molded encapsulation extending around the cables and over the splices so as to enclose the barrier layer, the materials of the encapsulation and of the barrier layer being separate and distinct from one another by any interfacial regions of the materials.

In the above method, the splices in one preferred arrangement are sealed from one another by enclosing each individual splice within a sealing material which extends around at least one of the cables and surrounding the sealing material with the barrier layer before forming the encapsulation. In an alternative arrangement in which the cables are gas pressurizable, a barrier layer which is preformed and is of substantially cylindrical configuration is located in a position surrounding one of the cables before forming the splices and is then moved axially of the cables into a final position surrounding at least one of the cables axially at each side of the splices and bridging the splices so as to form a chamber containing the splices. A seal is then provided between the encapsulation and the jackets of the cables to enable the chamber to be pressurizable.

The invention also includes an assembly of two telecommunications cables disposed with conductors of each cable electrically connected together to form splices with the splices electrically insulated from one another, a barrier layer extending over the splices, surrounding adjacent end portions of both cables axially at each side of the splices and extending between the adjacent end portions to enclose a region between the end portions, and a molded plastic encapsulation extending over the cable so as to enclose the barrier layer, the encapsulation and barrier layer being separate and distinct from one another at any interfacial region of the materials.

Figure 2:
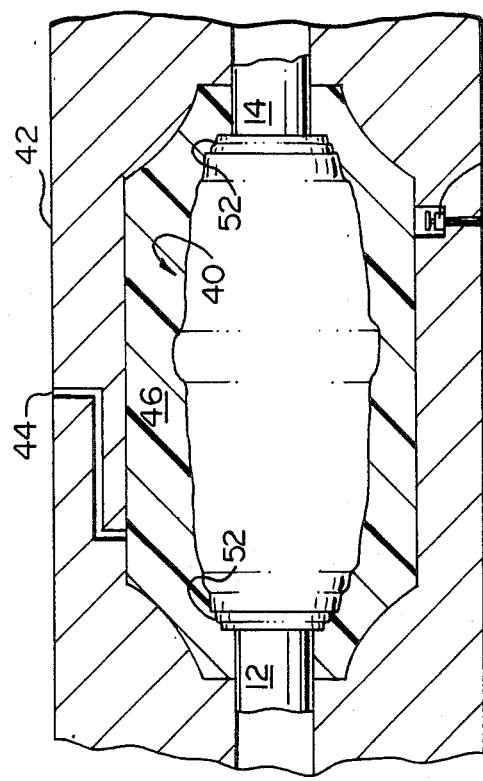
Figure 3:
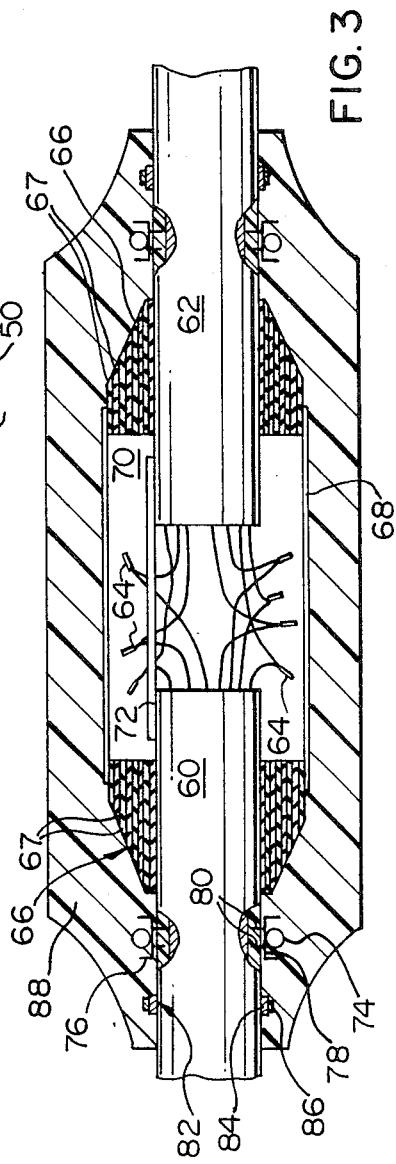

Embodiments of the invention will now be described by way of example with reference to the accompanying drawings in which:

FIG. 1 relates to a first embodiment and is a cross-sectional view through an encapsulated splice region formed across two electrically connected cables;

FIG. 2 is a side elevation of the splice region housed in a mold and preparatory to forming an encapsulation; and FIG. 3 is a view similar to FIG. 1 of a second embodiment.

In a first embodiment as shown in FIG. 1, an encapsulated splice region 10 formed between two cables 12 and 14 disposed end-to-end, comprises a plurality of splices 16 arranged in groups of circumferentially extending splices disposed at different axial positions surrounding the cable 14 as shown in FIG. 1. The number of splices depends upon the numbers of conductor pairs in each of the cables and in this particular embodiment, each cable includes 900 pairs of conductors.

The splice region is formed in the manner described in U.S. patent application Ser. No. 752,745 entitled "Forming Of Cable Splice Closures" filed July 8, 1986 in the names of L. J. Charlebois, J. R. Scott and R. R. D'Aoust. As described in the aforementioned copending application, a ground bar 18 and a rigid metal support 20 are disposed at circumferentially opposite positions one on each side of the two cables 12 and 14 as shown in FIG. 1. The ground bar and the metal support are each sealed by wrappings 22 of heat softenable tape material such as ethylene-propylene rubber, which are wound around the cables both beneath and over the ground bar and the support. Over the upper layer of wrappings 22 is formed a stiffening material in the form of overlapped windings 24 of vinyl tape which extend completely axially across the windings 22 so as to bridge the windings 22 and the grounding bar and the support. The wrappings 24 assist in the stiffening of the connection between the two cable ends so that substantially all of the movement between the cable ends is eliminated.

With the conductor ends projecting through the vinyl layer wrappings 24, as described in the aforementioned application, individual conductors of one cable are electrically connected to individual conductors of the other to form the splices 16. A first group of the splices is then positioned with the splices of the group circumferentially spaced-apart around the cable 14. To seal the first group of splices in position, a layer 26 of deformable sealing material is first positioned over the vinyl layer 24 before the splices are located in position. A second layer 28 of the deformable material is then disposed over the first layer so as to cover the first group of splices. The deformable sealing material of layers 26 and 28 is ethylene-propylene rubber sealing tape.

A layer 30 of resilient sealing tape is then wrapped around the layer 28 in a localized axial position, i.e. so as to lie around the conductors of the first group of splices. This layer of resilient tape material is of any suitable material for the purpose of permanently compressing the ethylene-propylene tape material. A requirement for the resilient tape material is that it may be stretched sufficiently so as to apply a degree of radial compression to the layers 26 and 28 to cause their permanent deformation under the compressive force. A suitable material for the layer 30 includes a tape referred to throughout the telecommunications cable industry as "DR Tape" or a neoprene rubber tape. Subsequent groups of splices are then located around the cable in the manner discussed above with each of the splices in each group being circumferentially spaced from others in the group. Each group of splices is laid between its own two layers of deformable material such as layers 32 and 34 are shown in FIG. 1. Thus the method of laying the further groups of splices is similar to that previously discussed. Over each group of splices is applied a further layer of resilient sealing tape such as layer 36 which is disposed over the conductors of its respective group in a manner similar to the positioning of the layer 30 discussed above.

After the splices have been located in the positions shown and have been provided with their layer of resilient tape material, then, according to an essential feature of the present invention, a barrier layer 38 is positioned over the splices so as to extend around the cables axially at each end of the splices. As shown in FIG. 1, this barrier layer 38 is formed from wrappings of vinyl tape which extend axially between the adjacent end portions to enclose a region between the end portions, and which may extend completely axially over the ends of the previous wrappings so as to completely enclose them. Preferably, however, and as shown in the present embodiment, the vinyl wrappings terminate axially short of the top layer, i.e. layer 34 of the ethylene-propylene tape forming the compressible material.

The formed splice region 40 is then disposed in a mold as shown by FIG. 2. The mold comprises two mold halves 42 only one of which is shown as the view is taken on the parting line of the mold. Moldable material is extruded through inlet gate 44 into the mold cavity 46 to mold the encapsulation 48 (see FIG. 1) with polyethylene material. The polyethylene flows through the mold and fills the cavity and completely encloses the vinyl layer 38. Upon the mold becoming full of material, it switches off automatically by the use of a switch means 50 which is operated automatically. This switch is described in detail in U.S. Pat. No. 4,490,315 granted Dec. 25, 1984 in the name of L. J. Charlebois et al and entitled "Methods of Moulding of Plastics Articles".

It is a requirement of the present invention that the ethylene-propylene rubber tape layers should be softened sufficiently to cause them to merge together while also ensuring that the production of toxic gases is minimized. The temperatures for molding are therefore carefully controlled so that no fusion will take place between the molding material and the jackets for the cables. In this embodiment, the jacket material is basically polyetheylene and it is intended to use a different grade of polyethylene for the molding operation. A required temperature for the molding material is below 204° C. and preferably between 160° C. and 190° C. as the molding material enters the mold. It has been found that with a molten temperature set at about 190° C. immediately before the molding material enters the mold, this provides a molten temperature of about 145° C. (maximum) when contacting the cable jackets in a suitably designed aluminum mold which is water or air cooled to a temperature of around 20° C. Under such controlled conditions, no fusion takes place between the two different polyethylene materials used for the plastics moldings and the cable jacket. The degree of heat retention, which is related of course to the rate of heat dissipation, is also an important factor and this is dependent upon the type of material used for the mold and the temperature to which it is cooled.

In addition to the fact that the molding temperature is such that a fusion bond does not take place between the plastic molding forming the encapsulation 48 and the cable jackets, the resilient material in each of the layers 30 and 36 is not heated sufficiently to soften it, as it is required to these layers to remain in their stretched condition. In contrast to this, the heat retention and the temperatue of molding is sufficiently high for a fusion bond to take place between the ethylene-propylene rubber layers and between these layers and the encapsulation at any interfacial region between them such as occurs along the region 52 which projects axially at each end from the barrier 38.

Hence it follows that the ethylene-propylene rubber layers which contact each other are merged into a single mass completely surrounding each individual splice and also surrounding the conductors where these pass between the layers. Thus, although the encapsulation 48 is not bonded to the jackets, moisture cannot reach the splices 16.

Because of the use of the two completely different types of materials in the barrier layer and in the encapsulation, then no bonding takes place between these two materials at the molding temperature. However, if moisture should penetrate between the jackets and the ends of the encapsulation at their interfacial regions which is possible because no bond exists between them, then the bonding action which takes place at the projecting regions 52 of the ethylene-propylene rubber to the encapsulation forms a seal which prevents moisture from penetrating into the interfacial region between the barrier 38 and the encapsulation.

As can be seen from the above description, the embodiment provides an encapsulated splice region in which the splices are adequately sealed from contact by moisture by the various heat softenable layers which are merged into a integral whole surrounding each of the splices. This is the case even though the jacket material is not bonded directly to the encapsulation at the two ends of the encapsulation and even though a bond is not provided between the layer 38 and the encapsulation.

As can be seen from the above description, should it be necessary to open the encapsulated splice region for any purpose, then the only area in which the encapsulation is bonded to the splice region is around the axially narrow regions 52. It has been shown in practice that these regions need only be approximately 0.5 inches in axial width to provide all the seal which is necessary to prevent moisture from travelling over and under the barrier layer. The encapsulation is removed simply by forming a crack along its axial length, for instance with the use of a chisel. Apart from at the bonded positions 52, the encapsulation is then easily removable by splitting it into two halves which, conveniently, simply move away from the surface of the barrier layer 38. The narrow bond area provided by the regions 52 at each end is easily cut away.

While it is preferred to have seals at the two ends of the barrier layer 38, e.g. as shown at the regions 52, such fused seals are, in fact, not essential. It is essential in this embodiment that the ethylene-propylene layers completely merge together around each splice so as to seal it. It is also necessary according to the invention that the sealing material is sealed to each conductor insulation extending to a splice to prevent moisture tracking along the insulation. For this reason in this embodiment, the resilient layers, such as layers 30 and 36 are essential. In a modification (not shown) of the first embodiment in which the barrier layer 38 extended completely over the ethylene-propylene layers so that no regions 52 were provided, it was found that moisture reached none of the splices even though no seal was used to prevent moisture seepage over and under the barrier layer. In the modification, as in the first embodiment, no fused seal was used to prevent moisture from passing between the jacket of each cable and the contacting layer of ethylene-propylene layer. The only seal was formed as a mechanical seal formed under molding compression and subsequent shrinkage of the encapsulation. This caused the encapsulation to readily compress itself against the barrier layer 38 and to compress the innermost ethylene-propylene layer against the cable jackets.

Tests were performed both upon an encapsulated splice according to the embodiment and according to the modification. In all tests, the regions of the cable extending from and closest to the encapsulations were immersed with the encapsulations in a bath of water or ice. The cable regions remote from the encapsulations were raised out of the bath to enable the conductors at each side of the splice region to be suitably connected up to equipment for making an insulation resistance test on all conductor pairs. The regions of the cables beneath water were cut into to enable water to reach the outside of the conductor insulations in the cores and water was pumped along the cables to ensure that it penetrated into the region 54 (FIG. 1) between the opposed cable ends and laying within the splice region. In the test, the temperature of the bath was cycled for at least 50 cycles between $-40°$ C. and $+60°$ C. The insulation resistance test on all pairs showed that the resistance remained above $10^9$ ohms which was a clear indication that the water in the bath did not penetrate to any of the splices. Not only is this a clear indication that the fused together ethylene-propylene rubber layers form an effective seal, but also that water was prevented by the layers 30 and 36 from penetrating from the region 54 under pressure and to any of the splices.

In a second embodiment, as shown in FIG. 3, two cables 60 and 62 are gas pressurizable and are joined end-to-end by forming splices 64 between their conductors. These splices are individually sealed with a sealing material so as to electrically isolate them from one another. These splices are left as can be seen by FIG. 3, within the region between the two cables 60 and 62 and without securing them to either one cable or the other.

The two cable ends are surrounded with a deformable means 66 which is composed of overlaid wrappings 67 of ethylene-propylene rubber tape material with the wrappings in each layer being overlapped. It is convenient for the layers to be narrower in the radially outer regions so that a tapered effect to the deformable means is provided as shown by FIG. 3. A barrier layer 68 is then located so as to extend axially between the cable ends and across the formed splices. This barrier layer is preformed in substantially cylindrical configuration and is disposed axially along one of the cables before the conductors are aligned together. After the splices are made and the deforming means 66 is constructed, the barrier layer is then moved axially into its position shown in FIG. 3 in which it surrounds the two cable ends and bridges the splices so as to surround them and provide a chamber 70 which contains the splices. In this position, the barrier layer is supported at its ends by the deformable means 66. The barrier layer should be of any material which will not bond to the encapsulation material at the molding temperatures. This may be because the softening temperature of the barrier layer lies above the molding temperature of the encapsulation or because the barrier layer is of a material which does not soften. In this particular case, the barrier layer is formed from a grade of cardboard of sufficient strength to prevent it from collapsing under the low molding pressures used in molding the encapsulation. These molding pressures are extremely low in this process and would not exceed 100 lbs psi. In fact in the process as followed commercially, the pressures do not exceed 15 lbs to psi.

Prior to the forming of the splices, a ground bar 72 is positioned between the two cable ends in conventional fashion and this ground bar is capable of taking some of the axial tensions across the splice region. In addition to this, however, the structure in FIG. 3 is provided with a strain relief device 74 at each end of the splice region. This strain relief device comprises a strap member which is bent around each of the cables 60 and 62 and has flanges 76 upstanding from a base 78 which contacts the cable. Each of the bases is formed with a piercing means in the form of prongs 80 which project into the cable jacket to hold the base in position. As the encapsulation is molded in position, then the flanges become embedded in the material of the encapsulation. Thus, after manufacture if any tensile load is placed across the encapsulated splice region, then this load is taken from each cable jacket through the prongs 80 into the base and then from the flanges 76 into the encapsulation which itself is then placed in tension from end-to-end. The strength of the encapsulation is thus improved above that merely provided by the grounding bar 72. A construction using a strain relief device of this type is described in a copending Canadian Patent Application No. 462,241, filed Aug. 31, 1984 (U.S. Ser. No. 648,461 filed Sept. 7, 1984), entitled "Cable Encapsulation and Strain Relief" in the name of L. J. Charlebois. In addition to this, a seal 82 is disposed around each cable end. Each seal 82 is disposed axially outwardly from the wrappings 67 and is of a construction described in a U.S. Pat. No. 4,570,032 entitled "Cable Splice Encapsulation Seal", in the names of L. J. Charlebois and K. H. Dick, issued Feb. 11, 1986. As described in the latter specification, the seal 82 comprises an inner wrapping layer 84 of a material which is deformable so that under compression it will intimately engage the surface of the jacket so as to form a first seal to prevent moisture ingress along the jacket surface towards the splices and the chambers 70. Such a material for the inner layer is an ethylene-propylene rubber. An outer layer 86 which is wrapped around it, needs to be a resilient tape material which is stretched very tightly so as to provide the required compressive force upon the layer 84. This layer may be a neoprene rubber tape or that known as "DR Tape" in the telecommunications cable industry. With this construction, because the layer 84 in the final structure is compressed, it forms a permanent compressive seal against the outer surface of its respective jacket, and the outer regions of the layer 84 which form an interface with the encapsulation are bonded thereto during the encapsulation process by heat softening of the ethylene-propylene rubber. It follows that when the encapsulation 88 is formed by the molding process in a manner similar to that described in the first embodiment, then a seal is provided at each end of the encapsulation by the seal 82 thereby preventing the escape of gas under pressure from the chamber 70 notwithstanding that the encapsulation itself is not bonded to the jacket of either of the cables 60 and 62.

During the forming of the encapsulation 88, no bond takes place between the encapsulation material and the cardboard forming the barrier. In this embodiment, a bond will take place between the deformable means 66 and the encapsulation. This bond and the small bond existing between each of the seals 82 and the encapsulation is the only resistance offered to removal of the encapsulation when it is split axially along its length for removal purposes. As can be seen, the bonds at these positions are over a very small area and this is easily cut away.

In a modification of the embodiment shown in FIG. 3 (not shown), a layer of material such as vinyl tape may be wrapped over the deformable means 66 in each case to act as a barrier between and prevent any bond taking place between the deformable means 66 and the encapsulation. In this case, the encapsulation 88 is more easily removed as it does not bond at any position between the seals 82 at the ends and there may be a slight mechanical grip between the flanges 76 and the encapsulation as it is removed.

It should be added that the deformable means 66 is provided for the purpose of ensuring that no cracking takes place in the encapsulation such as is caused by thermal cycling. Should there be temperature variations causing differences in expansion of the encapsulation as compared to the barrier layer and to the cables, then the deformable means will act as a damping means which distorts under the stresses involved to prevent any cracking of the encapsulation because of excessive stress.

What is claimed is:

1. A method of forming an encapsulated splice region joining two cable ends comprising:
    locating two cable end portions close together and substantially in axial alignment;
    electrically connecting conductors of one cable with those of the other to form splices and sealing each individual splice within dielectric sealing material to electrically isolate it from other splices;
    covering the splices by surrounding the cable end portions at each axial side of the splices with a barrier layer which extends also over the splices and between the cable end portions to enclose a region between the cable end portions; and
    forming a plastic molded encapsulation extending around the cables and over the splices so as to enclose the barrier layer with the barrier layer preventing the encapsulation material from penetrating into the region between cable end portions and into regions of the splices, and the materials of the encapsulation and of the barrier layer being separate and distinct from one another at any interfacial regions of the materials.

2. A method according to claim 1, comprising sealing the splices from one another by enclosing each individual splice within a sealing material which extends around at least one of the cables; and surrounding the sealing material with the barrier layer before forming the encapsulation.

3. A method according to claim 2, comprising forming the barrier layer by making overlapped wrappings of a tape material around the cable ends and over the splices, and applying the encapsulation material at a temperature to provide insufficient heat to cause any bonding of the molding to the jacket material.

4. A method according to claim 3, comprising providing two ends of the sealing material projecting axially beyond the barrier layer, the sealing material being a heat softenable material, the temperature of application of the encapsulation material being sufficient to soften the sealing material so as to fuse the encapsulation and sealing materials together at the two projecting ends of the sealing material and thus form a seal at each end.

5. A method according to claim 1, wherein the cables are gas pressurizable, the method comprising:
    surrounding the cable ends and splices with a preformed barrier layer of substantially cylindrical configuration by locating the barrier layer in a position surrounding one of the cables before forming the splices and then moving the barrier layer axially of the cables into a final position surrounding at least one of the cables and axially at each side of the splices so as to bridge the splices and to form a chamber containing the splices; and
    providing a seal between the encapsulation and jackets of the cable to enable the chamber to be pressurizable.

6. A method according to claim 5, comprising providing a plastically deformable means in a position surrounding each cable and disposing the barrier layer in its final position with its ends supported by the deformable means which axially flank the chamber.

7. An assembly of two telecommunications cables disposed with conductors of each cable electrically connected together to form splices with the splices sealed within dielectric sealing material so as to be electrically isolated from one another, a barrier layer extending over the splices, surrounding adjacent end portions of both cables axially at each side of the splices extending between the adjacent cable end portions to enclose a region between the end portions, and a molded plastic encapsulation extending over the cable end portions and enclosing the barrier layer, the encapsulation and barrier layer being separate and distinct from one another at any interfacial regions of the materials and said region between the cable end portions being free of encapsulation material.

* * * * *